United States Patent
Motzaeli et al.

(10) Patent No.: US 10,053,658 B2
(45) Date of Patent: Aug. 21, 2018

(54) MACHINE AND PROCESS FOR PRODUCING A SOLID ALCOHOL PRODUCT

(75) Inventors: Gal Motzaeli, Kiryat-Yam (IL); Shai Leibovich, Eden Prairie, MN (US)

(73) Assignee: AEGSV VENTURES, LLC, Hauppauge, NY (US)

( * ) Notice: Subject to any disclaimer, the term of this patent is extended or adjusted under 35 U.S.C. 154(b) by 106 days.

(21) Appl. No.: 12/655,726

(22) Filed: Jan. 7, 2010

(65) Prior Publication Data

US 2011/0223308 A1 Sep. 15, 2011

Related U.S. Application Data

(63) Continuation-in-part of application No. 12/218,658, filed on Jul. 17, 2008, now Pat. No. 7,981,456.

(60) Provisional application No. 61/007,199, filed on Dec. 11, 2007.

(51) Int. Cl.
*B67D 1/00* (2006.01)
*C12G 3/00* (2006.01)

(52) U.S. Cl.
CPC .................................. *C12G 3/005* (2013.01)

(58) Field of Classification Search
CPC .......... C12G 3/005; C12G 3/085; C12G 1/02; C12G 1/0203; C12G 3/02; C12G 3/04; C12G 3/065; C12G 3/12; A23G 9/045; C12M 21/12; C12M 29/18; C12M 29/24; C12M 41/18; B01D 1/0047; B01D 5/0087; B01D 21/2405; C12P 7/06; C12P 2203/00; C02F 1/5209; C02F 1/5236

USPC ............. 99/275, 277.2, 470, 276, 277, 455; 426/592, 576, 573, 11, 330.4, 433, 565, 426/577, 442, 583, 590, 61, 250, 602; 62/340; 366/144; 222/146.1
See application file for complete search history.

(56) References Cited

U.S. PATENT DOCUMENTS

| | | | |
|---|---|---|---|
| 3,554,771 A | 1/1971 | Wiczer et al. | |
| 3,843,809 A | 10/1974 | Luck | |
| 4,688,550 A * | 8/1987 | Lopes | C10L 1/328 126/378.1 |
| 4,702,611 A * | 10/1987 | Crossley | A23G 9/045 366/325.1 |
| 4,790,999 A | 12/1988 | Ashmont et al. | |
| 4,957,765 A * | 9/1990 | Widmar | C12G 3/04 426/250 |
| 5,019,414 A | 5/1991 | Valdes | |
| 6,213,174 B1 | 4/2001 | Cook et al. | |
| 6,403,140 B1 | 6/2002 | Tiainen et al. | |
| 6,737,098 B1 | 5/2004 | Devine et al. | |
| 6,772,675 B2 | 8/2004 | Ervin | |
| 2003/0215548 A1 | 11/2003 | Mihajlovic | |
| 2004/0253360 A1 | 12/2004 | Squicciarini | |

(Continued)

OTHER PUBLICATIONS

PCT Preliminary Report, dated May 13, 2009.

(Continued)

*Primary Examiner* — Tu B Hoang
*Assistant Examiner* — Joseph Baillargeon
(74) *Attorney, Agent, or Firm* — Andrew F. Young, Esq.; Lackenbach Siegel, LLP

(57) ABSTRACT

A process and apparatus for producing a solid, edible ethanol containing product which may be either a rubbery solid or a hard solid that is frozen about 24.8° F. (−4° C.). The product contains agar and gelatin and the ethanol may be provided in the form of selected alcoholic beverages.

1 Claim, 1 Drawing Sheet

(56) References Cited

U.S. PATENT DOCUMENTS

| | | |
|---|---|---|
| 2005/0142253 A1 | 6/2005 | Purcell |
| 2006/0070979 A1* | 4/2006 | Christenson ............. C11D 7/02 216/83 |
| 2008/0041070 A1 | 2/2008 | Johnson et al. |
| 2008/0226777 A1 | 9/2008 | Helfend et al. |
| 2009/0148582 A1 | 6/2009 | Leibovich et al. |

OTHER PUBLICATIONS

J. B. Hyne and R. M Levy, The Effect of Added Electrolyte on Hydrogen-Bonding Equilibrium in Dilute Solutions of t-Butyl Alcohol in Carbon Tetrachloride, Can. J. Chem. 40(4): 692-700 (1962), http://pubs.nrccnrc.gc.ca/cgibin/rp/rp2_abst_e?cjc_v62104_40_ns_nf_cjc).

* cited by examiner

MACHINE AND PROCESS FOR PRODUCING A SOLID ALCOHOL PRODUCT

CROSS REFERENCE TO RELATED APPLICATIONS

This is a continuation-in-part of application Ser. No. 12/218,658 filed Jul. 17, 2008 which claims priority from Provisional Application No. 61/007,199 filed on Dec. 11, 2007.

FIELD OF THE INVENTION

This invention relates to a machine and method for making ethanol products that are a homogenous solid at temperatures only a few degrees below the freezing point of water and can be stored in the freezer of the typical home refrigerator.

BACKGROUND OF THE INVENTION

In the past, numerous attempts have been made to provide a frozen or solid ethanol product. However, a problem has been that very low temperatures have been required. For example, one approach is shown in U.S. Pat. No. 3,809,809 which discloses the combination of vodka or other alcoholic beverages with sodium metabisulfate and gelatin but, while estirification of ethanol in the presence of sodium metabisulfate is mentioned, a liquid product is not directly available because solidification is achieved by drying or vacuum dehydration whereas an object of the present invention is to preserve alcohol and water together in a homogenous solid.

In U.S. Pat. No. 4,790,999 to Ashmont, et al. a soft ice made from alcohol and sodium carboxymethyl cellulose is described but the end product is not hard, whereas another object of the present invention is to provide a relatively hard product.

U.S. Patent Publication No. 2003/0215548 A1 to Mihajlovic discloses an ice cream that contains ethyl alcohol, gelatin, and sodium carborymethyl cellulose. This publication mentions trapping microscopic portions of an ethyl alcohol/water solution in a tri-dimensional gel structure to reduce the interaction of ethyl alcohol with milk proteins and flavors in ice cream so that the flavor and aroma of the ice cream are preserved. However, an object of the present invention is to provide a machine and method for producing a homogenous, hard, solid ethanol product without an ice cream mix.

In U.S. Patent Publication No. 2004/0253360 A1 to Squireiarini, a hard frozen food containing alcohol and pectin as the gelling agent is disclosed. However, significant dilution with water is described and a freezing temperature of −20° F. is employed, whereas an object of the present invention is to avoid dilution and achieve hard freezing at temperatures close to the freezing point of water. Further, US Patent Publication No. 2008/0041070 A1 discloses an alcohol infused ice cube and dispenser but requires a temperature of about 0° F. where an object of the present invention is to provide a homogenous product with a relatively high alcohol content which is solid within a few significantly higher temperatures.

The foregoing and other objects are achieved by the present invention which is described below.

SUMMARY OF THE PRESENT INVENTION

The present invention is directed to freezing a mixture/solution that contains alcohol at temperatures higher than it would be expected that the mixture would freeze. In one aspect of the invention, selected gelling agents are added in a controlled process into an existing brand of alcoholic beverage. Upon addition of said additives, the beverage may be frozen in a freezer at temperatures as high as negative four (−4) degrees centigrade (24.8° F.), which is readily accomplished in household refrigeration now in use. The commercial applications are numerous. For instance, producers of alcoholic beverages may increase their brand strength by introducing a frozen version of their product, particularly in view of the increasing popularity of flavored alcoholic beverages.

In another aspect, the present invention is a process comprising the steps of: mixing agar with room temperature water, stirring and heating the water solution, increasing the stirring rate as the solution is being heated, to a predetermined temperature, then filtering the solution, adding gelatin and again stirring, optionally adding sodium metabisulfite; cooling the solution to room temperature; adding a selected alcoholic beverage, mixing; and freezing the mixture, preferably at about 24.8 F (−4 C), but freezing can be at a lower temperature but is not required.

In a further aspect, the invention is a method for producing a frozen alcohol product comprising the steps of: filling a first tank with water at room temperature which is usually around 20° C., but may be in the range from 18 C to 30 C; stirring the water vigorously and adding agar preferably at about 3 grams per liter; heating the stirred mixture from room temperature to about 50° C. over the minimum time of about 5 minutes; increasing the stirring rate by as much as five times over the same period of time it takes to increase the temperature from room temperature to about 50° C. so that the stirring rate increase and temperature increase are simultaneous; keeping the mixture heated at about 50° C. to 60° C. and continuing stirring at the increased speed keeping the temperature stable between about 50 and 60° C., preferably about 55° C., passing the mixture through a 100 to 400 micron filter, preferably a 340 silk micron filter; and returning the mixture to the first tank; reducing the stirring rate to about 20% of its previous level and adding gelatin preferably at about 18 grams per liter as the mixture is cooled and its temperature drops to about 25° C.; then heating the solution from 25° C. to about 57° C. at a minimum time of about five minutes; increasing the stirring rate as the temperature is increased simultaneously; keeping the mixture heated at about 57° C. and at the higher stirring rate; transferring the solution to a second tank and cooling the solution to 25° C. while continuing the higher rate of stirring for a period of about 15 minutes; then adding the desired amount of beverage alcohol to the mixture at a volume ratio up to about 1:1, preferably 24% to 38%, and mixing the solution at the higher rate for 5 minutes. The solution may now be frozen and it will freeze to a uniform, homogenous solid at about −4° C.

In still another aspect, the present invention is a machine or apparatus for preparing the solution to be frozen into an alcohol containing solid, edible product and for providing a means to perform the foregoing described process. The apparatus comprises first and second mixing tanks, each tank having variable rate stirring means, heating and cooling means with variable rates of heating and cooling, inlet and outlets for liquids, the first tank having an upper inlet for a source of water; a filter; pump, valves and connecting line means to pump the mixture from the first tank through the filter and return it to the first tank; pump means to move the mixture from the first tank to the second tank; a source of ethanol or alcoholic beverages and pump means for delivering said ethanol to the second tank; and, means for delivering the alcohol containing solution in the second tank to a delivery port. Preferably, the filter is a 340 silk micro filter and tanks 1 and 2 are double walled with the outer wall being thermally insulated and the space between the walls containing heating and cooling pipes or coils. The foregoing will be better appreciated by reference to the drawing and detailed description that follows.

BRIEF DESCRIPTION OF THE DRAWINGS

The drawings attached hereto and made a part of this specification are by way of illustration and not by limitation. In the drawings.

DETAILED DESCRIPTION

Figure 1:
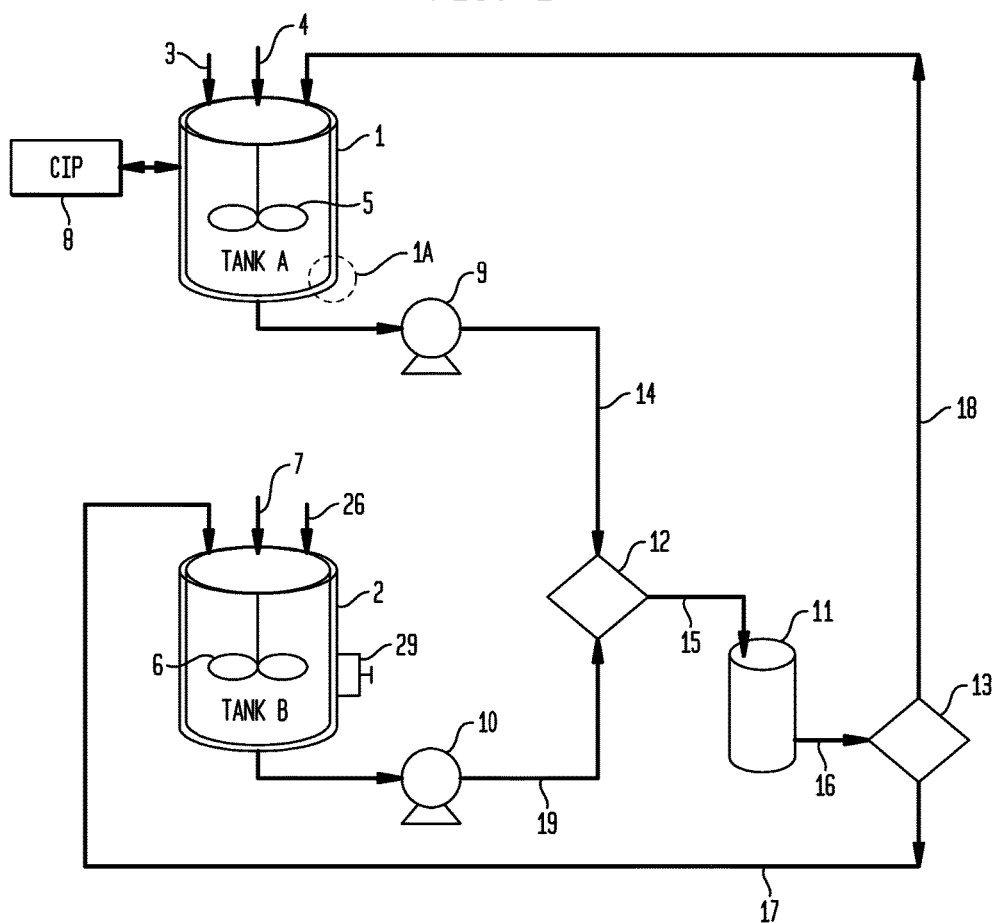
FIG. 1 is a schematic representation of an apparatus of the present invention which has been developed to perform the method of the invention.

First, in a general description of the invention, attention will be directed specifically to ethanol which is produced in the process of fermentation. All spirits, wines, beers and other alcoholic beverages contain this chemical in various volume fractions. Aqueous solutions of alcohol (water+ethanol) freeze in a range of temperatures, ethanol-water solution containing more than 40% ethanol by volume will not freeze in most household freezers unless they are designed to hold at 5° F. or lower. This phenomenon (the increase in freezing point of the solution) is not the colligative freezing point depression (the similar phenomenon that is responsible for boiling point elevation and osmotic pressure) that is experienced upon addition of, for example, salt to water. Pure ethanol, though its molecular weight is higher than that of water, freezes at a much lower temperature simply because hydrogen bonds do not play such an important role in the interactions among the ethanol molecules. The freezing point of the solution is then the result of thermodynamic mixing rules.

TABLE 1

Freezing points of solutions of water and ethanol (source - http://www.engineeringtoolbox.com/ethanol-water-d_989.html)

| % Ethanol Volume | | 0 | 10 | 20 | 30 | 40 | 50 | 60 | 70 | 80 | 90 | 100 |
|---|---|---|---|---|---|---|---|---|---|---|---|---|
| Freezing Point | (F.) | 32 | 25 | 15 | 5 | −10 | −25 | −55 | −75 | −110 | | 175 |
| | (° C.) | 0 | −4 | −9 | −15 | −32 | −37 | −48 | −59 | −73 | −115 | |

To overcome the effect that the addition of ethanol has on the freezing point of the solution, it has been found necessary to add a food additive that would introduce some chemical interaction with water and/or ethanol. This additional chemical interaction would induce freezing despite the presence of ethanol. Some examples of such additives and the anticipated effects they would have are:

I. Decrease the volume fraction of free ethanol in the solution in a reversible manner. If each additive molecule binds itself weakly to several ethanol molecules, the stated effect is achieved. If, upon melting in the mouth, the interactions between the additive and the ethanol are overcome by thermal energy, the ethanol is reintroduced into the solution. As an example, this could be done by adding either a macromolecule such as a poly-carbohydrate (e.g., agar, nature gum, carrageenan, pectin, cellulose, konnyaku, etc.) or a polypeptide (e.g., gelatin, casein, whey, etc.). If the concentration of these additives is high enough, a gel is formed in the solution. This gel serves to both elevate the modulus of the solution and would interact with ethanol to decrease its volume fraction in solution. Achieving this effect is not restricted to the addition of a gelling agent. It has been shown that a polar electrolyte molecule interacts with several tert-butyl alcohol molecules via hydrogen bonds, functioning as nucleation centers for aggregates of alcohol molecules (http://pubs.nrc-cnrc.qc.ca/cgi-bin/rp/rp2_abst_e?cjc_v62-104_40_ns_nf_cjc). The benefits of such an effect are threefold: In order to lower the effective concentration of free alcohol in solution, it is necessary to lower the mobility of the alcohol molecules, making them more susceptible to freezing and order is introduced lowering the entropy of the system. Finally, alcohol moieties are prone to react with acids under acidic catalysis (sulphuric acid is a common catalyst) to form esters. This condensation reaction is reversible. If additives are introduced that make this reaction favorable, they achieve the objective of reducing the volume fraction of free ethanol in the solution. Indeed, most esters are immiscible in water. This is advantageous in the sense that the ester actually precipitates out of solution. Since the esterification reaction is reversible, under the correct conditions (melting in the mouth), the ethanol may be reintroduced into the product.

When contemplating the possible interactions between ethanol and an additive, the following types of interactions may be envisioned:

A. Covalent bonding: As mentioned, the forming of ester moieties is the prevalent reaction.

B. Electrostatic interactions: These are unlikely as the pKa of ethanol is 16. That is, it is very weakly acidic. Hence, achieving dissociation of the alcoholic proton in an edible product seems unlikely. The high pKa is due to the unstable anion formed upon dissociation. For example, tert-butyl alcohol would have a significantly lower pKa due to stabilization of the negative charge by the tertiary carbon.

C. Hydrogen bonds: These are possible. This requires introduction of a food additive rich in hydrogen bond acceptors such as strong electrolytes or alcohol, carbonyl, ether or nitrogen-containing moieties.

D. Van der Walls interaction: These seem irrelevant to the present invention as they are too weak.

II. Introduce more order into the solution, as mentioned above. This decreases the initial entropy of the solution, bringing it closer to ordered state it would obtain upon freezing and should, in turn, decrease the energy threshold for the onset of crystallization. Two ways this may be achieved are by either causing aggregation of alcohol molecules due to hydrogen bonds with the additive or by introducing some food additive which requires hydration. The water molecules hydrating the additive molecules are either bound to them weakly or water forms a "cage" around them. A well-known effect that relies on this hydration is the hydrophobic effect, allowing micellization to occur in aqueous solutions. These cages may serve as seeds for further crystallization.

The first option (aggregation of alcohol molecules) has been discussed. Addressing the cage effect more specifically, it is known that water forms these highly ordered cages around the hydrophobic tails of surfactant molecules. It is also known that water hydrates hydronium ions with anywhere between 6 to 20 water molecules ties to a single hydroniumion. (http://en.wikipedia.oarg/wiki/Hydronium).

III. Lower the energetic threshold for crystallization via enthalpic interactions. For example, if a food additive is introduced, which increases the ionic strength of the solution, the water molecules may interact more strongly with each other. This may stabilize the ice despite the presence of the alcohol.

IV. Draw the solution into a gel by way of osmotic pressure (swelling of a gel by a solvent), in essence fixing the alcohol inside the network. More specifically, this effect requires the introduction of a gelling agent at concentrations that would achieve a gel of a critical or higher number of cross-links. Regardless of whether the additive has favorable or neutral interactions with water and alcohol, these would be drawn into the gel due to osmotic pressure. As previously mentioned, osmotic pressure is a colligative property, independent of the identity of the swelling agent. Of course, if the additive has favorable interactions with water and alcohol, i.e. it is charged or otherwise contains hydrogen bond acceptor moieties, then the chemical potential at standard state would dictate more swelling overall (it is the pressure difference between the standard state and the swelled state that is independent of the identity of the swelling agent).

This type of effect may, under certain circumstances, preclude the necessity to freeze the solution. That is, the solution is turned into a rubbery network at room temperature. The alcohol would be lost overtime to the surrounding via evaporation. This process should, however, be inhibited to some degree by the same considerations that cause the alcohol to be drawn into the network.

Turning now to a first and preferred embodiment and best mode of the invention, two additives are employed. The first additive is agar. Agar (also known as agar-agar) is a polysaccharide comprised of galactose, a hydroxyl-rich monosaccharide. Commercially, this additive is extracted from the cell membrane of algae. Generally, agar forms stronger gels than gelatin. It exhibits hysteresis in that its melting point in water is 85° C. versus a 32-40° C. temperature window for solidification. Commercially available agar may be found in one of three manifestations: agarose is the unmodified polysaccharide. Specifically, it is a linear chain comprising alternating D-galactose and 3,6-anhydrogalactose units, the former having three hydroxyl moieties and the latter having one hydroxyl group and one ether oxygen (a hydrogen bond acceptor). Due to its high pKa, it is generally electrostatically neutral. Since hydrogen bonds between hydroxyl moieties are not significant, this form of agar is not expected to add much enthalpic interaction with the ethanol in solution. Agaropectin is a linear chain of b-1,3-glycosidically linked D-galactose units. However, its hydroxyl moieties are modified to some degree to become acidic groups. Most commonly, they are sulfated. The presence of sulphuric acid catalyzes the esterification of ethanol in the presence of acids. This is beneficial in the context of this invention, as is discussed below. Overall, the presence of these groups adds a significant element of enthalpic interaction with the ethanol, either via covalent or hydrogen bonding. Agaropectin in itself is not sufficient in the context of this invention, as its gelling properties are much inferior to those of agarose. Pure agaropectin is in fact a non-gelling agent. The third manifestation is simply a mixture of agarose and agaropectin. The mixture usually comprises 30% agaropectin and 70% agarose. This mixture adds an element of gelling and an element of enthalpic interactions to achieve either covalent or hydrogen bonds with ethanol. Agar in of itself is insoluble in ethanol. Hence, its use in this invention is directed to solubilization in water to form the first step in producing the desired gelling solution.

The second ingredient is gelatin or gelling agent. Gelatin is in essence hydrolyzed collagen. It is a protein rich in glycine, praline and hydroxyproline amino acids. It is mainly the interactions between the latter two amino acids which allow gelatin to form triple helices, much in the same manner that DNA forms double helices. Upon heating in solution, the three helix strands dissociate, releasing the strands to become coils in solution. If the solution is then cooled, many strands will form triple helices again. However, the reformation of the helices is not perfect. This allows a physically cross-linked network to form in solution. It is believed that the gel formed in this matter would be superior to gels formed by macromolecules that exhibit weaker interaction such as poly-carbohydrates. The function of the additive is to form a network via physical cross-links. This additive contains many H-bond acceptor moieties to attract water and alcohol.

An optional but desirable additive is sodium metabisulphite. This is a preservative. Upon addition to aqueous solutions, it releases $SO_2$ and sulphuric acid is formed in the solution. While it lowers the pH of the solution, the dissociation of sulphuric acid introduces hydronium ions in the solution ($H_3O^+$). As previously stated, each hydronium ion requires 6 to 20 molecules of water to hydrate it. The water molecules form a dodecahedral cage around the ion. These cages introduce order into the solution. It is thought that the hydronium ion acts as an aggregation center for the alcohol.

Naturally, in the presence of edible acids, sulphuric acid may catalyze the esterification of ethanol as previously stated. If the reaction favors the ester at low temperatures while it favors the alcohol and acid at warmer temperatures, it may serve the purpose of taking the ethanol out of solution while in the freezer, allowing water and the remaining ethanol in solution to freeze.

When adding gelatin in intermediate amounts, the resulting solution is a product with the consistency of a sorbet. The gelling agents form a physically cross-linked network with a mesh size that is big enough to allow crystallization of the water. The beverage swells this network, as previously described. To this mixture may be added various sugars, edible acids or various other additives. These may be added to modify such parameters as the modulus of the gel, its consistency, the vapor pressure of the liquid that swells the network, etc. The consistency, at this point, is not that of a hard frozen product, but rather that of a soft frozen product. However, when consumed, the alcohol effect is felt in the mouth.

When adding smaller amounts of gelatin, it has been discovered that it is favorable to first allow the network to form (i.e., warm the gelatin in water to dissociate the strands and then allow the solution to cool for a while) to some degree before adding the alcoholic beverage.

The following list sets forth important parameters for the process:

1. The identity of the additives: The best frozen result was obtained without a gelling agent present but contained a small percent of sodium metabisulphite. However, a room-temperature solid cannot be obtained without the presence of the network.
2. The gel strength of the gelatin network is measured in bloom units. Different bloom values are the result of the mean molecular weight and the molecular weight distribution of the gelatin polypeptides. These are determined by several factors. Key among these is the duration of exposure of the collagen to the acid or alkali agents. The origin of the collagen (the tissue from which it is extracted, the types of collagen present in said tissue, the age of the animal, etc.) is also a key parameter. The higher the bloom strength of the gel, the lower the concentration of gelatin required to achieve the same gel strength, the correlation is given by: $C*\sqrt{B}=const$. C is the gelatin concentration and B is its bloom strength. Consequently, when one wishes to obtain the same gel strength at lower concentrations of the gelling agent, one must use a material with a higher mean molecular weight and with a smaller polydispersity index.
3. Identify the additives that serve to strengthen the network and absorb ethanol and/or the gelling agent. These additives (e.g., silicone dioxide and bentonite) increase the gel modulus by forming physical crosslink sites, much in the same way that the addition of ash to strengthen polybutadiene and polyisoprene blends in making automobile tires, is crucial to make the tires adequate for use. This type of additive would allow using a lower concentration of the gelling agent. Concurrently, they might absorb alcohol achieving effect in paragraph 1 above.
4. The order in which the additives are added, e.g., when introducing edible acids and sodium metabisulphite to incorporate the alcohol into ester bonds, the catalyst needs to be added first to allow proper dissolution.
5. The temperatures at which the additives and alcoholic beverages are added.

The following examples set forth preferred embodiments of the invention and represent preferred embodiments and the concentration of agar and gelatin in warm water (104° to below 119° F.) can range from 3% to 30% depending on the application; and the resulting solidified alcohol mixture/product (at below 24.8° F.) will melt slowly at room temperature and will dissolve completely. No phase separation occurs and samples could be re-solidified when placed back at T=24.8° F. (−4° C.). A list of beverages that have been used is set forth below:

Brand Name Beverages and Generic Beverages that were Used for Final Products. These are 1. Bacardi Rum
2. Jack Daniels
3. Tequila Cuervo
4. Absolute
5. Absolute Citron
6. Remy VSOP
7. Gin
8. Baileys
9. Bushmills Malt/Single Malt
10. Pina Colada
11. Irish Cream
12. Coccolo Pas
13. Quantro
14. Liqueur Apricot
15. Pizang
16. Screwdriver Cocktail
17. Margarita Cocktail
18. Black Russian Cocktail
19. Kahlùa Coffee Liqueur
20. Kahlùa Liqueur
21. Godiva Chocolate Liqueur Example 1

Laboratory Demonstration

One liter of pure water is heated to 55° C. (131° F.). While maintaining this temperature, the water is mixed at a high rate (i.e., 350 rpm and higher). As the warm water is mixed, 1.5% by weight of food-grade agar is added. The agar preferably should be of the purest quality. Mixing preferably persists for at least 10 minutes while maintaining the temperature of the solution at 55° C. The steady shear viscosity of the solution should not be higher than 2000 cp (centipoise), or 2 Pa*s (the steady shear viscosity of water is typically 1 cp, or 0.001 Pa*s). After 10 minutes have passed, and the solution is clear, indicating that the agar had completely dissolved in the water, 1½% by weight of food-grade gelatin selected from gelatin E400-449 in Codex Alimentarius and in which E441 is a preferred gelatin that is added while vigorously mixing the solution. The gelatin should be of the purest quality and produced from an animal source, preferably bovine. Mixing should persist for at least an additional 15 minutes while maintaining the temperature of the solution at 55° C. After 15 minutes have passed, and the solution is clear, indicating that the gelatin had completely dissolved in the water, sodium metabisulphite may or may not be added, according to the preferences of the user. The solution is passed through a 100-micrometer filter and is cooled to room temperature. The resultant gelling solution is gently mixed (about 35 RPM for duration of ten minutes) with the alcoholic beverage at a volume ratio of 1:1 or 2:1 alcoholic beverage: gelling solution to obtain roughly 23.6% and 37.8% that is about 24% to about 38% alcohol, respectively. Mixing should desist once the mixture seems to be completely liquid. About four (4) hours after the final product has reached room temperature, it may be placed in a freezer (T=24.8° F.) where it freezes solid. It could also be kept in its liquid state for freezing at a later time.

As mentioned above, any food additives may be used instead of or in addition to agar and gelatin. Food color agents, sugars and flavor enhancers could be added to this formulation while maintaining the same effect of solidifying the solution at ambient condition or using a household freezer. The foregoing ratios of ingredients in the mixture may be incorporated in larger or smaller batches.

This example yields better results when applied to the freezing of neat alcoholic beverages such as: vodka (Absolute, Absolute Citron), gin (Jean), whiskey (Jack Daniel's), brandy/Congac (Remy V.S.O.P.), rum (Bacardi).

Example 2

One liter of pure water is heated to 55° C. While maintaining this temperature, the water is mixed at a high rate (i.e., 350 RPM and higher). As the warm water is mixed, four percent by weight of gelatin is added. Mixing should persist for at least 10 minutes while maintaining the temperature of the solution at 55° C. After 10 minutes have passed, and the solution is clear, indicating that the gelatin had completely dissolved in the water, sodium metabisulphite may or may not be added, according to the preferences of the user. The solution is passed through a 100-micrometer filter and is cooled to room temperature. The resultant gelling solution is gently mixed (about 35 RPM for a duration of ten minutes) with the alcoholic beverage at a volume ratio of 3:1 alcoholic beverage: gelling solution. The resultant solution is left to cool to room temperate. About four (4) hours after the solution has reached room temperature, it may be placed in a freezer (T=24.8° F.) where it freezes solid. It could also be kept in its liquid state for freezing at a later time.

This example yields better results when applied to the freezing of juice or cream containing alcoholic beverages, such as screwdrivers (alcoholic beverage consists of equal volumes of orange juice and vodka), margaritas (alcoholic beverage consists of equal volumes of juice and tequila), and black Russian (75% vodka and 25% Bailey's).

Example 3

One liter of pure water is heated to 55° C. While maintaining this temperature, the water is mixed at a high rate (i.e., 350 RPM and higher). As the warm water is mixed, 4% by weight of gelatin is added. Mixing should persist for at least 10 minutes while maintaining the temperature of the solution at 55° C. After 10 minutes have passed, and the solution is clear, indicating that the gelatin had completely dissolved in the water, sodium metabisulphite may or may not be added, according to the preferences of the user. The solution is passed through a 100-micrometer filter and is cooled to room temperature. The resultant gelling solution is gently mixed (about 35 RPM for duration of 10 minutes) with the alcoholic beverage at a volume ratio of 5:2 alcoholic beverages: gelling solution. The resultant solution is left to cool to room temperate. About four (4) hours after the solution has reached room temperature, it may be placed in a freezer (T=24.8° F.) where it freezes solid. It could also be kept in its liquid state for freezing at a later time.

This example yields better results when applied to the freezing of crème-containing beverages, such as Bailey's Irish Cream.

Turning now to FIG. 1, an apparatus of the present invention is schematically presented which is suitable for large scale production will be described. Thermally insulated tanks 1 and 2 are shown having variable speed mixers 5 and 6 disposed therein. Typically the inner walls of the tanks are stainless steel and tank 1 would have a 100 liter capacity and tank 2 would have a 200 liter capacity. Variable speed mixers 5 and 6 that stir solutions within the tanks can operate from a low rotational speed of 60 RPM to 300 RPM and the mixers can operate at selected speeds within the two limits. The rotational speeds of the mixers are representative and not absolute, i.e. 60 RPM represents a low shear rate of mixing while 300 RPM represents a high rate.

Tank 1 has a controlled supply of water 3. High purity water is desirable, partially de-ionized water having a conductivity between 20 to 30 ms/m but potable water may be satisfactory. The clean-in-place (cip) system 8 allows cleaning solution to enter the tank and be removed between batches. The dry inlet 4 allows ingredients such as agar and gelatin to be added in dry form as required. First pump 9 circulates the mixture from the first tank through filter 11 through the connecting lines and three way valves which are appropriately opened and closed to achieve this function. Second pump 10 operates with pump 9 to move the mixture that is in one tank to the other tank through the connecting lines and valves which include three way valves 12 and 13. An ethanol mixture 26 from a reservoir (not shown) is introduced into the second tank 2 at the appropriate point during the process of preparing the mixture. The ethanol mixture will be a pre-selected beverage of choice. Sampling and delivery valve 29 allow samples to be taken from each tank to check the status of the mixture therein and at the end of the process when the alcohol has been properly added into tank 2, the final product is then delivered through valve 29.

Figure 1A:
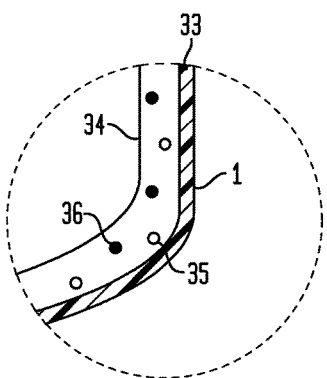
FIG. 1A is a section view of the corner of the wall of the second tank in FIG. 1.

Looking now at FIG. 1A, a section of the lower right corner of tank 1 is shown in blow-up detail. The wall and tank bottom are double walled with the outer wall having an insulating jacket 33 which is spaced apart from inner wall 34, the space between jacket 33 and wall 34 contains heating tubes 35 and cooling tubes 36 through which heated water and refrigerant respectively can flow. Tank 2 has a similar wall construction.

A preferred process of the present invention will now be described referring to the drawing of FIG. 1 as described in the foregoing paragraph.

The first step begins by filling tank 1 with water at room temperature which is preferably about 25° C.±5° or even a degree or two above or below this range High purity water such as de-ionized water is desired and preferable but ordinary drinking water available from a municipal supply may be acceptable.

In the second step, the water is stirred with a mixer 5 rotating at about 60 RPM or an equivalent shear viscosity rate of stirring or agitation. Agar is added at this time preferably at about 3 grams per liter through the dry ingredient line or port 4. During this step, the agar strands are dissolved in the mixture. Most of the strands are dissolved in the disaggregated, i.e., not in a double helix, form. In order for strands to aggregate as double helices, an energy input higher than the activation energy for the formation of the double helices is required. The thermal energy associated with ambiant temperature is smaller than the activation energy required to form double helices. Consequently, agar does not form a gel.

In the third step, the mixture is raised from 25° C. to about 50° C. over a minimum period of 5 minutes, that is, a preferred heating rate of 5° C. per minute by circulating heated water through heating tubes 36.

In step four, the stirring rate is increased about five-fold from about 60 RPM to about 300 RPM over the same period that it takes to increase the temperature, that is, if the temperature is increased 5° C. per minute, then it takes five minutes to heat from 25 to 50° C. This translates to 48 RPM increase per minute as the rate goes from 60 to 300 RPM over five minutes. In other words, the stirring rate increase should be simultaneous with the heating.

In the fifth step, the mixture is maintained at 50° C. and is stirred at 300 RPM for five minutes. The temperature should be stable between 50 and 55° C.

In the sixth step, the mixture is passed through a 340 micron silk filter in filter canister 11 and the three way valve configuration 12 and 13 allows the mixture to go through the filter and may alternatively be returned to tank 1 but preferably goes to tank 2. In the steps three through 6, the temperature is high enough to overcome the activation energy to form double helices. However, it is also too high to form stable, double helices. Consequently, most strands are still disaggregated.

The stirring rate is reduced in step seven from about 300 RPM to about 60 RPM. At this point gelatin is added at the rate of about 18 grams per liter. If there has been any volume lost it is compensated at this step.

In step eight, heating the solution from 25° C. to 57° C. in a minimum time of about five minutes takes place. This is a heating rate of about 6.4° C. per minute.

In the ninth step, the stirring rate is increased from 60 to 300 RPM at the same time it takes to increase the temperature, that is, the temperature ramp up is 6.4° C. per minute. Thus, it would take five minutes stirring increase to go from 60 to 300 RPM over five minutes. This stirring rate increase should be simultaneous with the heating.

In step ten, the mixture is maintained at a preferred temperature of about 57° C. and stirred at 300 RPM for ten minutes. This temperature should be stable between 55 and 57° C. The temperature in the steps seven through ten is high enough to overcome the activation energy to form double strands (agar) and triple strands (gelatin). However, it is also too high to form stable, double helices and triple helices. Consequently, those strands are still disaggregated.

In the eleventh step, the solution is transferred to tank 2 by means of pump 9, by means of connecting lines 14, 15, 16, and 17, and by means of three way valves 12 and 13. The solution is cooled to about 25° C. while mixing at about 300 RPM. The mixture continues to be stirred at room temperature and 300 RPM for a minimum of ten minutes. As the solution is cooled and stirred, hydrogen bonds are formed between pairs of strands effectively cross-linking them. The same process occurs with groups of three gelatin strands. Both networks are created at the same time and within the same space and they form an interpenetrating and independent, double network. One part of the network is comprised of agarose and the other of gelatin.

In the twelfth and last step, the ethanol solution or alcoholic beverage of choice is added to the mixture at a volume ration at 1:1. The addition of the alcohol solution is represented by arrow 26. The solution can be added manually or pumped from a reservoir where the desired solution is held. It is this high alcohol percentage which sets applicants' invention apart from other processes and from prior art. The solution is mixed at about 300 RPM for five minutes. As the alcohol is added, it is drawn to the strands of the double network due to a combination of enthalpic interactions, most commonly, hydrogen bonds and osmotic pressure. The higher the cross-linking density within the network, the higher the osmotic pressure and consequently, the higher the concentration of alcohol that can be added to the mixture. The combination of lower effective concentrations of alcohol in the solution in addition to the increased order in the system which reduces the initial entropic state contributes to the marked increase in the solutions' freezing point.

The solution now is ready for use and can be removed through valve or delivery port 29. It can be stored and frozen later or frozen immediately and then stored. It can be thawed and consumed or eaten directly or eaten as part of a desert.

One of the features of applicants' invention is that the solution can be thawed and refrozen and still maintain its homogeneity. In other words, upon thawing the mixture or solution does not separate into its components but remains a true solution.

While the above description is based on a preferred two tank system, one tank can be employed. For example, Tank 2 can be operated with water and the dry ingredients, agar and gelatin, added as described above but now at representative arrow 7 and the mixture circulated for filtering by means of pump 10 and line 19 with process step as described above. Furthermore, in another alternative when the solution is passed through filter 11, it can be moved through line 16 to three way valve 13, and through line 17 to tank 2 to continue the process there.

While specific embodiments of our invention have been disclosed above, modification may become apparent to those skilled in the art, upon reading this specification, but our invention is limited only by the scope of the following claims.

We claim:

1. An apparatus for preparing an edible ethanol solution having a relatively high ethanol content that can be frozen into a homogenous product at about −4° C., consisting of:
    (a) a first tank, having a variable speed stirrer for stirring a mixture therein heating tubes through which heated water can be circulated, a supply line for water, a dry inlet for ingredients in dry form, and a first tank outlet line;
    (b) a filter connected having a filter inlet line and a filter outlet line;
    (c) a first pump connected to the first tank outlet line and the filter inlet line;
    (d) a first three-way valve connected to the filter outlet line, the first three-way valve directing fluid to either the first tank or to a second tank;
    (e) the second tank having a variable speed stirrer for stirring a mixture therein cooling tubes through which refrigerant can be circulated, a dry inlet for ingredients in dry form, and a source of beverage ethanol from which the beverage ethanol can be delivered to the second tank, and a second outlet line corrected to a second pump;
    (f) a delivery valve for removing the contents from the second tank; wherein the first tank contains a solution in water consisting of 0.3% to 1.5% by weight agar and 1.5% to 1.8% by weight gelatin, at a temperature of 55° C. to 57° C.;
    (g) an outlet line connected to the second tank:
    (h) a second three-way valve interposed between the first pump and the filter inlet line;
    i) said second pump connected to the second tank outlet line and connected to the second three-way valve: wherein the second three-way valve directs fluid to the filter from either the first tank or the second tank; wherein the first tank further comprises cooling tubes through which refrigerant can be circulated; and wherein the second tank further comprises heating tubes through which heated water is circulated.

* * * * *